(12) United States Patent
Wilde et al.

(10) Patent No.: US 10,867,584 B2
(45) Date of Patent: Dec. 15, 2020

(54) SMART AND SCALABLE TOUCH USER INTERFACE DISPLAY

(71) Applicant: MICROSOFT TECHNOLOGY LICENSING, LLC, Redmond, WA (US)

(72) Inventors: Benjamin Wilde, Quincy, MA (US); Endre Bognar, Bellevue, WA (US); Manoj Sharma, Winchester, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 14/507,072

(22) Filed: Oct. 6, 2014

(65) Prior Publication Data

US 2015/0378524 A1 Dec. 31, 2015

Related U.S. Application Data

(60) Provisional application No. 62/018,290, filed on Jun. 27, 2014.

(51) Int. Cl.
*G09G 5/373* (2006.01)
*G06F 3/0488* (2013.01)
(Continued)

(52) U.S. Cl.
CPC ........... *G09G 5/373* (2013.01); *G06F 3/0481* (2013.01); *G06F 3/0488* (2013.01); *G09G 5/14* (2013.01);
(Continued)

(58) Field of Classification Search
CPC .......................... G09G 5/373; G09G 2340/04
See application file for complete search history.

(56) References Cited

U.S. PATENT DOCUMENTS

| 5,847,706 A * | 12/1998 | Kingsley | G09G 5/14 715/788 |
|---|---|---|---|
| 5,870,090 A * | 2/1999 | Takai | G06F 3/04842 715/788 |

(Continued)

FOREIGN PATENT DOCUMENTS

| EP | 0996053 A2 | 4/2000 |
|---|---|---|
| EP | 1174787 A2 | 1/2002 |

OTHER PUBLICATIONS

PCT International Search Report and Written Opinion in International Application PCT/US2015/037561, dated Oct. 9, 2015, 18 pgs.

(Continued)

*Primary Examiner* — Nhat Huy T Nguyen
(74) *Attorney, Agent, or Firm* — Merchant & Gould

(57) ABSTRACT

Aspects of the present disclosure relate to systems and methods for displaying a touchable user interface of a display device and displaying a user interface progress experience on the touchable user interface. In one aspect, available application space on the display device may be identified. An amount of available application space may be compared with an amount of space required for one or more user interface elements. A visible display of the one or more user interface elements may be adjusted based on the amount of available application space compared to the amount of space required for the one or more user interface elements. In another aspect, an action command associated with the one or more user interface elements may be selected and performed. While the selected action command is being performed and when a threshold value has been met, the user interface progress experience may be displayed.

20 Claims, 10 Drawing Sheets

(51) Int. Cl.
*G06F 3/0481* (2013.01)
*G09G 5/14* (2006.01)

(52) U.S. Cl.
CPC .............. *G06F 2203/04803* (2013.01); *G09G 2340/04* (2013.01); *G09G 2340/145* (2013.01); *G09G 2360/12* (2013.01); *G09G 2370/022* (2013.01)

(56) References Cited

U.S. PATENT DOCUMENTS

| | | | | |
|---|---|---|---|---|
| 6,642,945 | B1* | 11/2003 | Sharpe | G06F 17/30905 345/156 |
| 6,809,738 | B2* | 10/2004 | Hubrecht | G06T 17/00 345/423 |
| 6,892,359 | B1* | 5/2005 | Nason | G06F 3/038 715/778 |
| 7,590,947 | B1 | 9/2009 | Gay et al. | |
| 7,813,822 | B1* | 10/2010 | Hoffberg | G06K 9/00369 381/73.1 |
| 7,831,579 | B2 | 11/2010 | Wade et al. | |
| 8,402,372 | B2 | 3/2013 | Gillespie et al. | |
| 2004/0070627 | A1* | 4/2004 | Shahine | G06F 17/30991 715/794 |
| 2006/0119619 | A1 | 6/2006 | Fagans et al. | |
| 2007/0168859 | A1 | 7/2007 | Fortes | |
| 2008/0134082 | A1 | 6/2008 | Delacroix et al. | |
| 2008/0155413 | A1* | 6/2008 | Ubillos | G06F 3/0481 715/716 |
| 2009/0172531 | A1 | 7/2009 | Chen et al. | |
| 2009/0300542 | A1* | 12/2009 | Duarte | G06F 3/0481 715/800 |
| 2009/0319933 | A1* | 12/2009 | Zaika | G06F 3/048 715/772 |
| 2010/0001967 | A1* | 1/2010 | Yoo | G06F 3/0488 345/173 |
| 2011/0216064 | A1* | 9/2011 | Dahl | G06F 1/1616 345/428 |
| 2012/0064946 | A1 | 3/2012 | Voetberg et al. | |
| 2012/0069131 | A1* | 3/2012 | Abelow | G06Q 10/067 348/14.01 |
| 2012/0079432 | A1 | 3/2012 | Lee et al. | |
| 2013/0111391 | A1 | 5/2013 | Penner et al. | |
| 2013/0246576 | A1* | 9/2013 | Wogsberg | H04N 7/181 709/219 |
| 2013/0328912 | A1 | 12/2013 | Najarian et al. | |
| 2014/0026051 | A1 | 1/2014 | Roh et al. | |
| 2014/0071060 | A1* | 3/2014 | Santos-Gomez | G06F 3/0488 345/173 |
| 2014/0168277 | A1* | 6/2014 | Ashley | G06F 3/1446 345/672 |
| 2014/0195972 | A1* | 7/2014 | Lee | G06F 3/04817 715/811 |

OTHER PUBLICATIONS

Anonymous, "UI Patterns and Techniques: Progress Indicator", Nov. 4, 2005, retrieved from the internet: http://web.archive.org/web/20051104110220/http://time-tripper.com/uipatterns/Progress_Indicator, retrieved Sep. 29, 2015, 2 pgs.
"Samsung Galaxy S3 (Tutorial V): S Memo", Published on: Jun. 17, 2012 Available at: https://www.youtube.com/watch?v=w2TRIU8EWY8, 3 pgs.
"RoyalSlider—Touch-Enabled jQuery Image Gallery", Published on: Aug. 6, 2012 Available at: http://codecanyon.net/item/royalslider-touchenabled-jquery-image-gallery/461126, 3 pgs.
"Touch: Tap, Swipe, and Beyond", Published on: Jul. 20, 2013 Available at: http://www.microsoft.com/surface/en-us/support/touch-mouse-and-search/using-touch-gestures-tap-swipe-and-beyond, 4 pgs.
"Create, view & open files with Quickoffice", Retrieved on: Jun. 26, 2014 Available at: https://support.google.com/quickoffice/answer/2988488?hl=en, 2 pgs.

* cited by examiner

SMART AND SCALABLE TOUCH USER INTERFACE DISPLAY

CROSS-REFERENCE TO RELATED APPLICATIONS

This application claims the benefit of U.S. Provisional Patent Application No. 62/018,290, filed Jun. 27, 2014, entitled "SMART AND SCALABLE TOUCH USER INTERFACE DISPLAY," which application is incorporated herein by reference in its entirety.

BACKGROUND

Computer and software users have grown accustomed to user-friendly software applications that help them write, calculate, organize, prepare presentations, send and receive electronic mail, make music, and the like. For example, word processing applications allow users to prepare a variety of useful documents. Spreadsheet applications allow users to enter, manipulate, and organize data. Electronic slide presentation applications allow users to create a variety of slide presentations containing text, pictures, data or other useful objects.

To assist users to locate and utilize software applications, a user interface containing a plurality of command controls is typically provided along an upper, lower or side edge of a displayed workspace in which the user may enter, copy, manipulate and format text or data. Such commands often include selectable buttons with such names as "file," "edit," "view," "insert," "format," and the like. Typically, selection of one of these top-level buttons, for example "format," causes a drop-down menu or a bar to be deployed to expose one or more selectable controls associated with the top-level buttons, for example "font" under a top-level functionality of "format." However, as computing devices decrease in size, so too does the amount of screen space available for the display of the workspace, controls, and commands.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to an improved touch user interface for displaying and scaling software applications and/or selectable controls. More particularly, the disclosure relates to granular scaling of software applications (e.g., user interface elements) on a touchable user interface display to accommodate different window sizes, device sizes, and/or a change in window or device size.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Aspects of the disclosure are directed to an improved graphical user interface. As discussed above, smaller and smaller computing devices are being designed and utilized. As computing devices decrease in size, so too does the size of their display screens. Accordingly, the windows displaying the software applications are also small in size. The small windows provide less space to display the workspace (also referred to as a "canvas") and selectable commands and controls.

To address the above limitations, aspects of the disclosure relate generally to methods and systems for an improved touchable user interface. The improved touchable user interface displays and granularly scales selectable software applications and images within a workspace based on the size of the window displaying the software application and/or image or a change in the size or orientation of the window. In turn, the improved touchable user interface facilitates an efficient, simple, and easy one touch interface for manipulating software applications.

Figure 1:
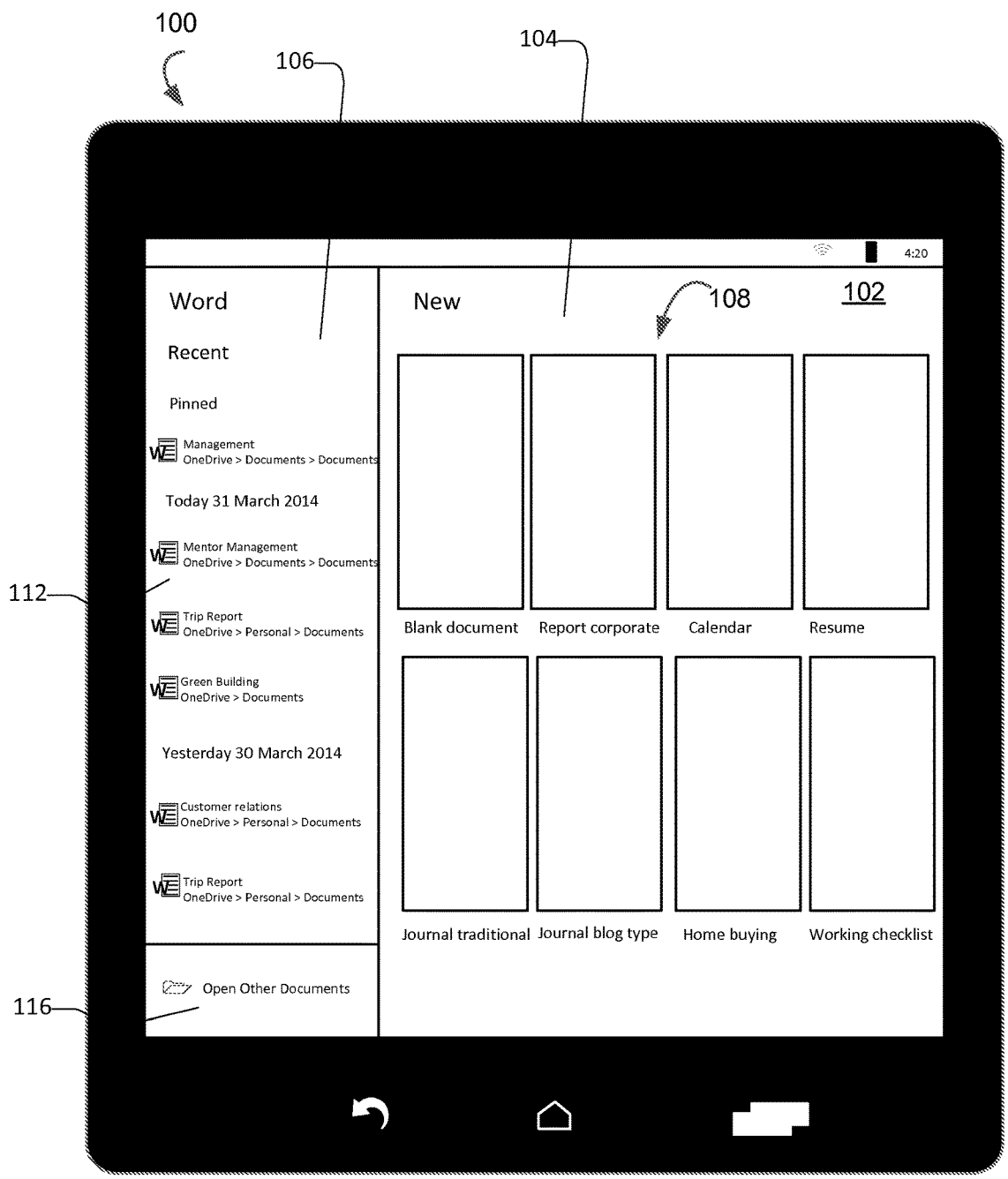
FIG. 1 is illustrates an exemplary computing device equipped with a touchable user interface, according to an example aspect.
Figure 2:
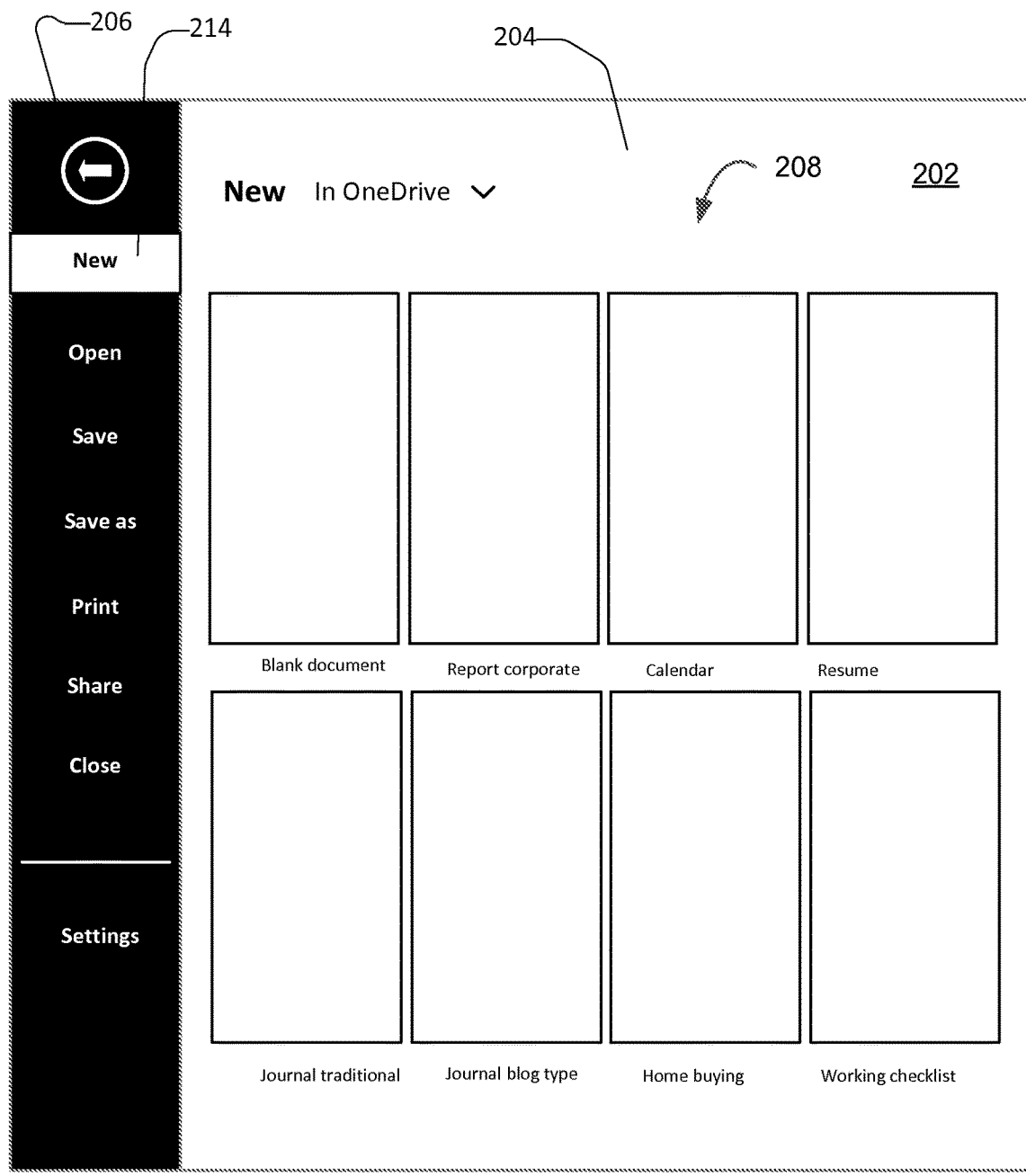
FIG. 2 illustrates an exemplary touchable user interface of a software application for displaying user interface elements, according to an example aspect.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. Referring now to FIG. 1 an example computing device 100 equipped with a touch screen, such as a tablet computer or a mobile phone, for example, is shown. As used herein, a touch screen includes a touchable user interface 102 that is capable of receiving input via contact with the screen, thereby functioning as both an input device and an output device. For example, content may be displayed, or output, on the screen and input may be received by contacting the screen using a stylus or by direct physical contact of a user, e.g., touching the screen. Contact may include, for instance, tapping the screen, using gestures such as swiping or pinching the screen, sketching on the screen, etc. As illustrated, the touchable user interface 102 displayed on the computing device 100 includes a canvas 104 and a contextual panel 106. The canvas 104 may display user interface elements 108. The contextual panel 106 may include software application information 112 and/or a plurality of individual selectable controls 214 (as shown in FIG. 2).

As described herein, the user interface elements 108 represent selectable elements. Generally, the user interface elements 108 refer to, for example, thumbnails, which represent a scaled down version of software applications and/or images such as documents, spreadsheets, presentation slides, and other objects. Accordingly, the user interface elements 108 contain readily utilized functionality when opening, creating, saving and/or viewing a software application using the touchable user interface 102. In this regard, aspects of the present disclosure make it possible for a user to have easy access to such user interface elements positioned on touchable user interface 102 such that software applications may be launched with a single touch and/or hand gesture from a start screen of the touchable user interface 102.

A user may work with and/or manipulate a new document and/or an existing document using the touchable user interface 102. In the exemplary aspect of FIG. 1, the user interface elements 108 include a plurality of various types of documents and/or templates. For example, the different types of documents and/or templates may include a blank document, a corporate report template, a calendar, a resume, a checklist, a journal document, and a home buying document, to name a few. In this regard, a user may open and create a new document of the user's choice from a start screen with a simple, single touch and/or hand gesture using the touchable user interface 102. As discussed above, the contextual panel 106 may include software application information 112 and/or a plurality of individual selectable controls 214 (as shown in FIG. 2). In this regard, the contextual panel 106 is a designated area or space displayed on the touchable user interface 102 that organizes and provides commands and/or controls for selection by the user of the application. In some aspects, the contextual panel 106 is located to the left of the canvas 104. In other aspects, the contextual panel 106 is located to right, above or below the canvas 104. The software application information 112 may include a list of existing documents. In the exemplary aspect depicted in FIG. 1, the software application information 112 includes a list of recently created Word documents including the date of when the existing documents were created and/or edited. The contextual panel 106 may additionally include a selectable option 116 for opening documents other than the documents included in the software application information 112.

In some aspects, when a user selects a new document or an existing document from the touchable user interface 102, the selected document may be displayed at full size such that the selected document occupies the entire display (e.g., all of the touchable user interface 102). As discussed above, detection of a user selection may include, for example, detection of a single touch or hand gesture which may include tapping, clicking, or highlighting an area of the touchable user interface 102, such as, tapping, clicking, or highlighting a user interface element 108, software application information 112 and/or a selectable control 214.

FIG. 2 illustrates a touchable user interface 202 for creating a new document according to one or more aspects. Similar to the touchable user interface 102 described above relative to FIG. 1, the touchable user interface 202 includes a canvas 204 and a contextual panel 206. The canvas 204 may include user interface elements 208 (e.g., such as the user interface elements 108 described above relative to FIG. 1). The contextual panel 206 may include selectable controls 214. For instance, such selectable controls may be general file commands such as "new," "open," "save," "save as," "print," "share," "close," and "settings." Aspects are not limited to these example selectable controls, and it should be appreciated that any number of selectable controls may be included in an initial or adjusted display of contextual panel 206. According to one aspect, the selectable controls 214 included in the contextual panel 206 may be controls that are generally found and used across a number of different software applications.

As shown in FIG. 2, the user interface elements 208 may be arranged and displayed in the canvas 204 as a grid layout with two rows and four columns. However, depending on the size of the canvas 204 (e.g., the size of the touch screen window space), the layout of the user interface elements 208 may change. For example, the number of rows and columns may be scaled based on the screen resolution and based on how many user interface elements 208 can be displayed in the canvas 204. In this regard, as the screen size gets smaller (e.g., when a user utilizes a mobile device instead of a tablet device) less user interface elements 208 may be displayed on the screen. In one example, the number of columns of user interface elements 208 is reduced when the screen size is reduced. In one aspect, the size of the user interface elements 208 does not change as the screen size changes. In another aspect, the size of the user interface elements 208 may change as the screen size changes such that the same number of user interface elements 208 is displayed regardless of the size of the screen. In yet another aspect, the size of the user interface elements 208 may change and the number of columns of user interface elements 208 may change when the screen size changes.

As such, the software application executed by the computing device 100 calculates a layout for the touchable user interface 102/202. In order to calculate an appropriate layout for the touchable user interface 102/202, the application has to identify the current window size of the software application utilized by a user. Identifying the window size of the software application includes identifying a change in the window size of the application. A window may change in size due to user selection (such as resizing of the window), based on a change of display screen for the computing device (such as changing from one monitor to a monitor of a different size), a change in device orientation between portrait and landscape, or based on a change in computing device. In smaller computer devices (such as phones, tablets, watches, and etc.), the window size of the application may correspond to the size and/or orientation of the display screen of the touchable user interface 102/202.

In one aspect, a layout (e.g., the layout shown in FIG. 2) is calculated by utilizing a priority list. In some aspects, the priority list identifies what user interface elements 208 are displayed in the canvas 204 and/or potential selectable controls 214 are displayed in the contextual panel 206 for various potential application window sizes. The priority list calculates scaling for any potential window size. In some aspects, the priority list calculates scaling for any potential window size up to a predetermined maximum window size and/or down to a predetermined minimum window size. In further aspects, the window size is calculated and/or identified by the priority list along with scaling. In some aspects, the priority list may cache or save some layouts that have already been computed for a certain device, (e.g. full screen landscape, full screen portrait), but the scaling logic utilized by the priority list does not have to rely on these saved layouts.

A user interface element 208 and/or other items may be displayed or designated utilizing a graphical representation. In some aspects, the priority list further identifies whether the user interface element 208 and/or other items should change in size based on an identified window size. In additional aspects, the priority list further identifies whether the spacing between a user interface element 208 and another item should change in size based on an identified window size. In some aspects, the canvas 204 of the touchable user interface 202 may be scaled such that an even number of user interface elements 208 are displayed. In one aspect, 24 user interface elements 208 may be displayed. In this example, the 24 user interface elements 208 may be scaled and displayed in various orientations as the screen size changes. The various orientations may include at least 24 rows by 1 column, 12 rows by 2 columns, 8 rows by 3 columns, 6 rows by 4 columns, 4 rows by 6 columns, 3 rows by 8 columns, 2 rows by 12 columns, and 1 row by 24 columns.

Figure 3:
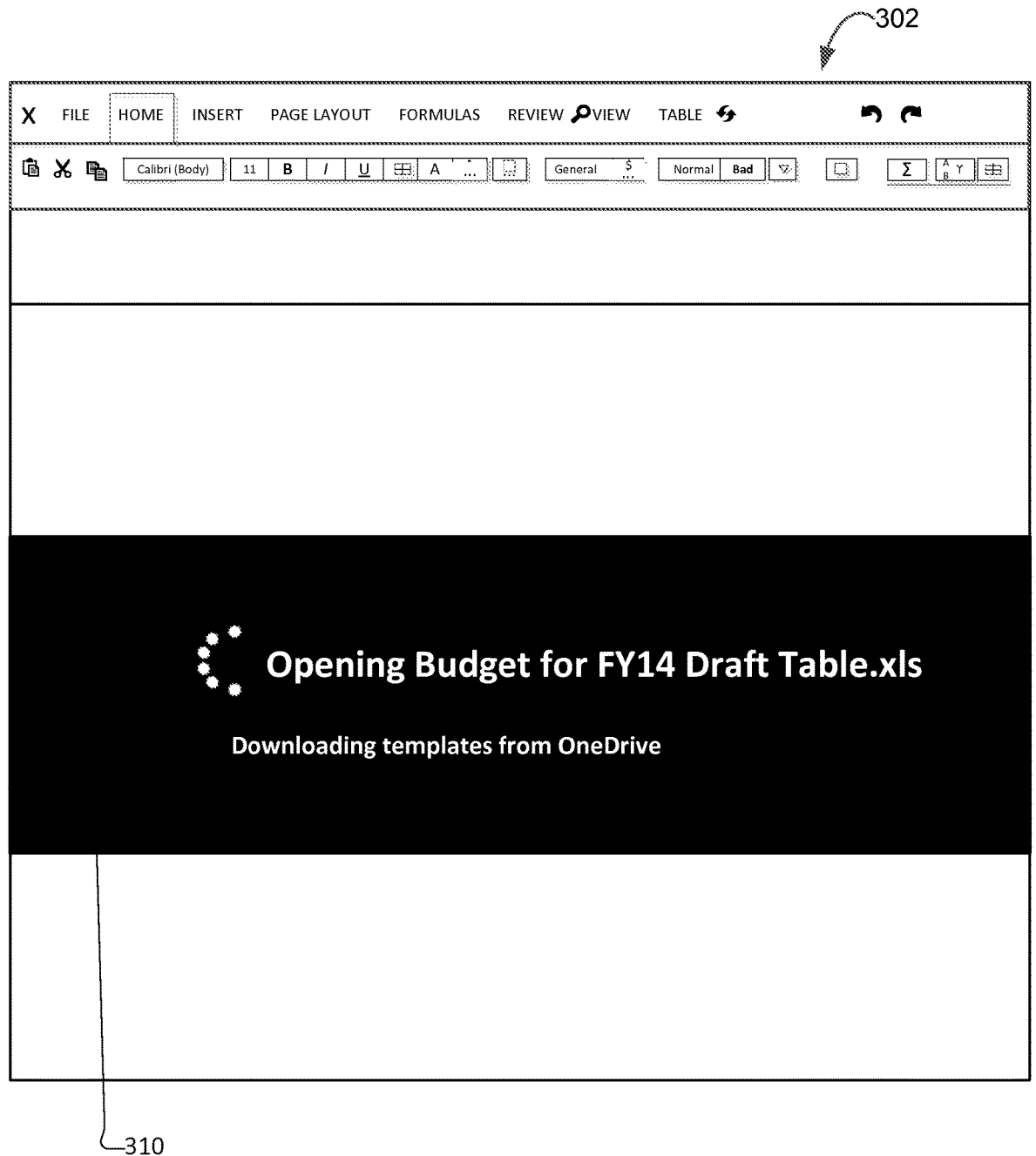
FIG. 3 illustrates an exemplary touchable user interface of a software application for displaying a user interface progress experience, according to an example aspect.

FIG. 3 illustrates a user interface 302 including a user interface progress experience 310 according to one or more aspects. The user interface progress experience 310 may indicate the status of an action associated with a user interface element 208. For example, if the user interface element 208 is a new Word document that a user wants to create, after the user selects (e.g., by touching the Word document using the user interface 302) the new Word document, the user interface progress experience 310 may show an opening status of the new Word document. In one aspect, the user interface progress experience 310 is displayed after a threshold value has been met. In this regard, in the example discussed above, if the new Word document opens before the threshold value has been met, the user interface progress experience 310 will not be displayed. However, if the new Word document does not open before the threshold value has been met; the user interface progress experience 310 will be displayed after the threshold value has been met. For example, if the threshold value is 2 seconds, the user interface progress experience 310 will be displayed after 2 seconds if the new word document is still in the process of opening after 2 seconds. When the process of opening the new Word document concludes, the user interface progress experience 310 is hidden from the display.

In one aspect, the user interface 302 may include a cancel button for canceling the action associated with a user interface element 208 and/or the display of the user interface progress experience 310. In this regard, while the user interface progress experience 310 displays the status of a document and while the action associated with the document is being performed, a user may select a cancel button. When the cancel button is selected, the user interface progress experience 310 may be hidden from the display and the software application may return to its previous state.

The action associated with a user interface element 208 may include any action capable of being performed in relation to a user interface element 208 such as opening, saving, creating, and sharing, to name a few. The threshold value associated with displaying the user interface progress experience 310 may be any threshold value suitable for the associated software application. For example, the threshold value may be based on avoiding a flickering of the user interface progress experience 310 in situations when an action is performed and completed in a short period of time.

Although FIG. 3 is described with respect to the user interface 302, it can be appreciated that the functionality described with respect to the user interface 302 may be implemented on a non-touch device. In one example, a tablet device may be utilized as a non-touch device when it is docked at a docking station. In this example, the functionality described above relative to the user interface 302 may be implemented using a cursor, for example. In this regard, in the example described above, after the user selects (e.g., by placing a cursor on the Word document using a device such as a mouse) the new Word document, the user interface progress experience 310 may show an opening status of the new Word document.

Figure 4:
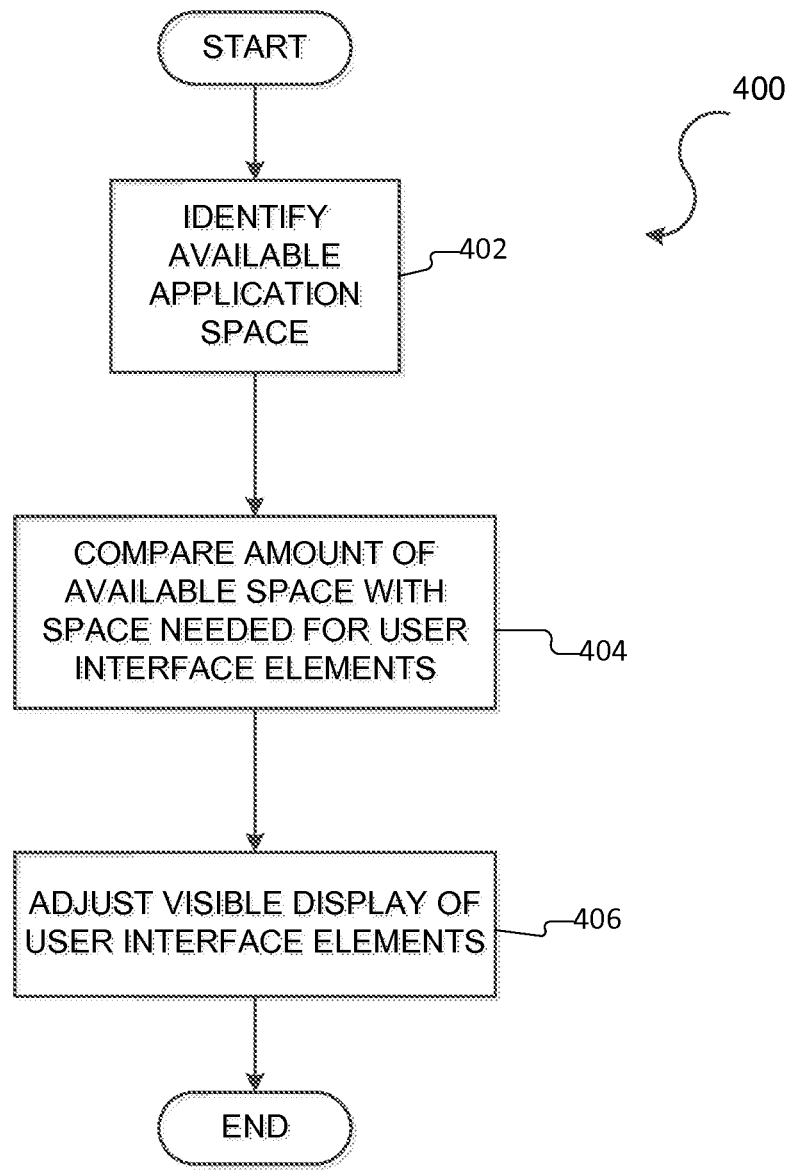
FIG. 4 illustrates an exemplary method for dynamically scaling user interface elements of a software application displayed on a touchable user interface of a computing device, according to an example aspect.

Referring now to FIG. 4, an exemplary method 400 for dynamically scaling user interface elements of a software application displayed on a touchable user interface of a computing device, according to an example aspect is shown. Method 400 may be implemented on a computing device or a similar electronic device capable of executing instructions through at least one processor. The improved touchable user interface may be displayed by any suitable software application. For example, the software application may be one of an email application, a social networking application, project management application, a collaboration application, an enterprise management application, a messaging application, a word processing application, a spreadsheet application, a database application, a presentation application, a contacts application, a calendaring application, and etc. This list is exemplary only and should not be considered as limiting. Any suitable application for displaying the improved touchable user interface may be utilized by method 400.

The computing device may be any suitable computing device for executing an application. Any suitable computing device may be utilized by method 400 for executing the application and displaying the improved touchable user interface. For example, the computing device may be at least one of: a mobile telephone; a smart phone; a tablet; a smart watch; a wearable computer; a personal computer; a desktop computer; a laptop computer; and etc. This list is exemplary only and should not be considered as limiting. Any suitable computing device or display device for executing the software application displaying the improved touchable user interface may be utilized by method 400.

Method 400 may begin at operation 402, where an amount of available application space is identified. In order to calculate the appropriate layout for the touchable user interface, an available application width or height may be identified or calculated. According to aspects of the disclosure, such calculations of available application space may involve ascertaining a number of available pixels in a given visual environment. In some instances, the available application width or height may correspond to an amount of window space available (e.g., within the parameters of a document open on a smartphone or other device when no other applications are open). In other instances, the available application width or height corresponds only to an amount of space available within the application upon execution (e.g., within the parameters of a document open on a tablet or other device when other applications are also open). Identifying the window size of the application may include identifying any changes in the window size of the application. A display screen may change in size due to user selection or based on a change in display screen for the computing device. In smaller computer devices (such as phones, tablets, watches, and etc.), the window size of the application may correspond to the size of the display screen.

In some instances, identifying an amount of available space may include identifying a change in an amount of available space, such as, when a user rotates a device to change its orientation or manually reduces an application size within a window.

Flow may proceed to operation 404, where a comparison is made between the amount of space available and the amount of space needed for the user interface elements. Upon identifying the available space, a component of the application executed by the computing device may calculate a layout for the touchable user interface. To perform such calculations, one or more application components may first calculate the size of each element. For instance, a pixel size may be determined for each element and/or region. A total available size needed to accommodate the touchable user interface may then be summed from the individual calculations. Depending upon the amount of space available to the application (e.g., due to screen size constraints, application window size adjustments, device type, etc.), each region of the touchable user interface may be constrained in terms of how many, if any, of the user interface elements, if any, may be displayed. Accordingly, to adjust to available space within a screen, the touchable user interface may first determine, for example, how many pixels each region encompasses, and may sum the pixel amounts to identify a total pixel size. A comparison may then be made between the total size needed and the amount of space available.

Upon identifying an amount of available space, flow may proceed to operation 406, where the visual display of the user interface elements may be adjusted. Accordingly, when insufficient space is available in the touchable user interface for displaying regions, a determination may be made at application run time as to any regions that may be scaled or eliminated. For instance, an amount of available space may be calculated based on screen width in pixels (e.g., 768 pixels), or a change in width or height from one pixel amount to 768 pixels, 500 pixels, or any other reduction/enlargement in pixel size may be detected. For instance, if the user manually reduces the size of the touchable user interface, or rotates the device so that the screen orientation changes, a similar determination may be made as to the available space for displaying the regions. As should be appreciated, a determination may be made as to the order of truncating functional or informational regions, as well as for determining which selectable functionality control sections are displayed and which sections are collapsed as the available space in the user interface is decreased.

Figure 5:
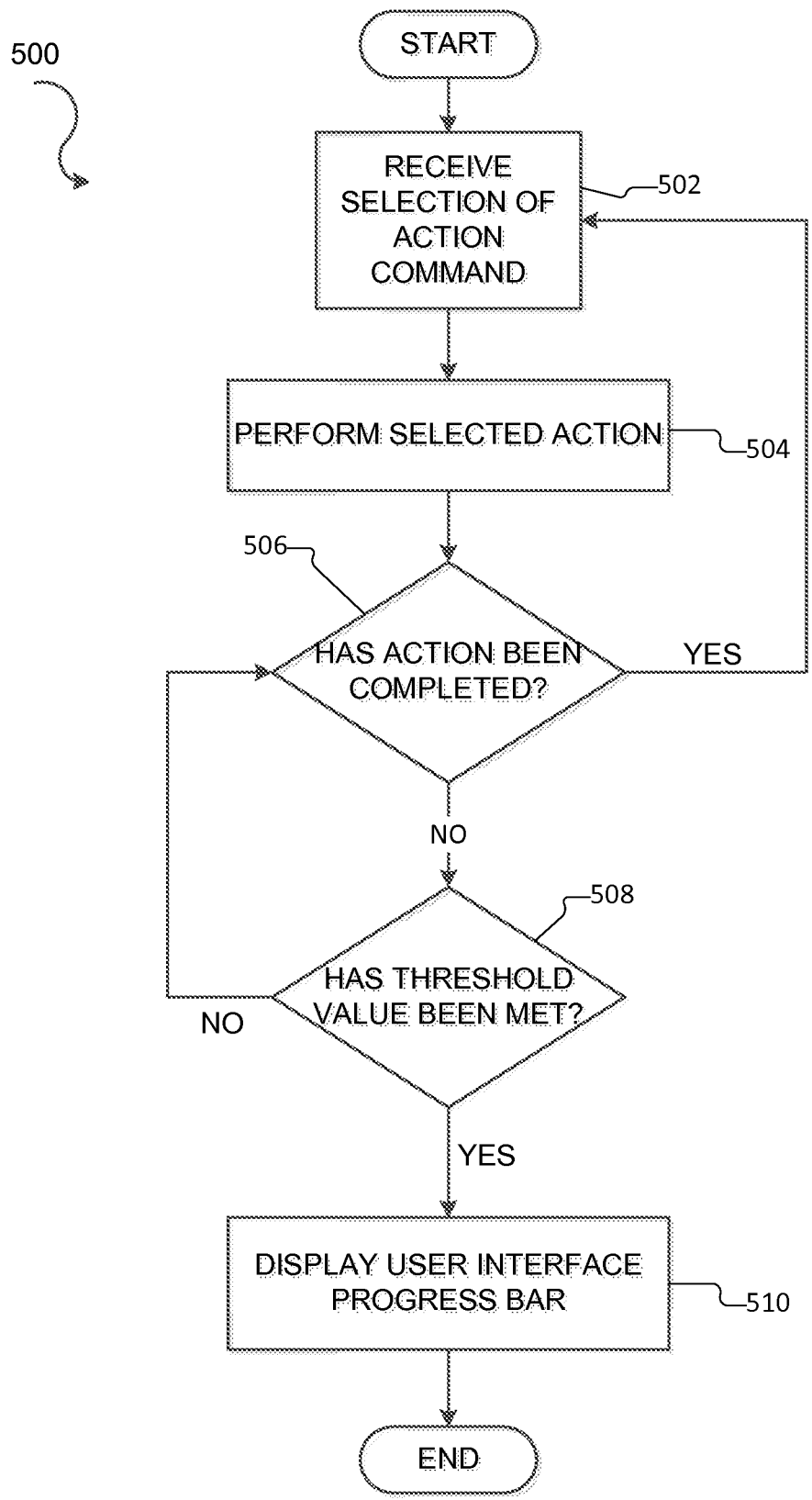
FIG. 5 illustrates an exemplary method for displaying a user interface progress experience on a touchable user interface of a computing device, according to an example aspect.

Referring now to FIG. 5, an exemplary method 500 for displaying a user interface progress experience on a touchable user interface of a computing device, according to an example aspect is shown. Method 500 begins at operation 502 where a selection of an action command is received. The action command may be received by a processor when a user selects (e.g., touches) a user interface element and/or a selectable control on the touchable user interface. The action command may include any action capable of being performed in relation to a user interface element such as opening, saving, creating, and sharing, to name a few.

After the action command is received, flow proceeds to operation 504 where the selected action is performed. For example, if the selected action is opening a document, the process of opening the selected document is performed. In another example, if the selected action is saving a document, the process of saving the selected document is performed. While the selected action is being performed, flow proceeds to operation 506 where it is determined whether the selected action has been completed. In the example regarding opening a document, determining whether the selected action has been completed includes determining whether the document has opened. If the action has been completed (e.g., if the document has been opened), flow proceeds back to operation 502 where a selection of a new action command may be received. If the action has not been completed, flow proceeds to operation 508 where it is determined whether a threshold value has been met. The threshold value is associated with displaying the user interface progress experience. The threshold value may be any threshold value suitable for the associated software application. For example, the threshold value may be based on avoiding a flickering of the user interface progress experience in situations when an action is performed and completed in a short period of time. In one aspect, the threshold value is two seconds.

If the threshold value has not been met, flow proceeds back to operation 506 where it is determined whether the action has been completed. If the threshold value has been met, flow proceeds to operation 510 where the user interface progress experience is displayed. The user interface progress experience may indicate the status of the selected action as it is performed. For example, after the threshold value has been met, the user interface progress experience may be displayed such that the user interface progress experience shows the status of the selected action as it is being performed. In the example of opening a document, the user interface progress experience may show that the document is being opened by displaying text such as, "opening document." When the action performed is complete, the user interface progress experience may be hidden from the display.

Techniques for providing a scalable touchable user interface are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
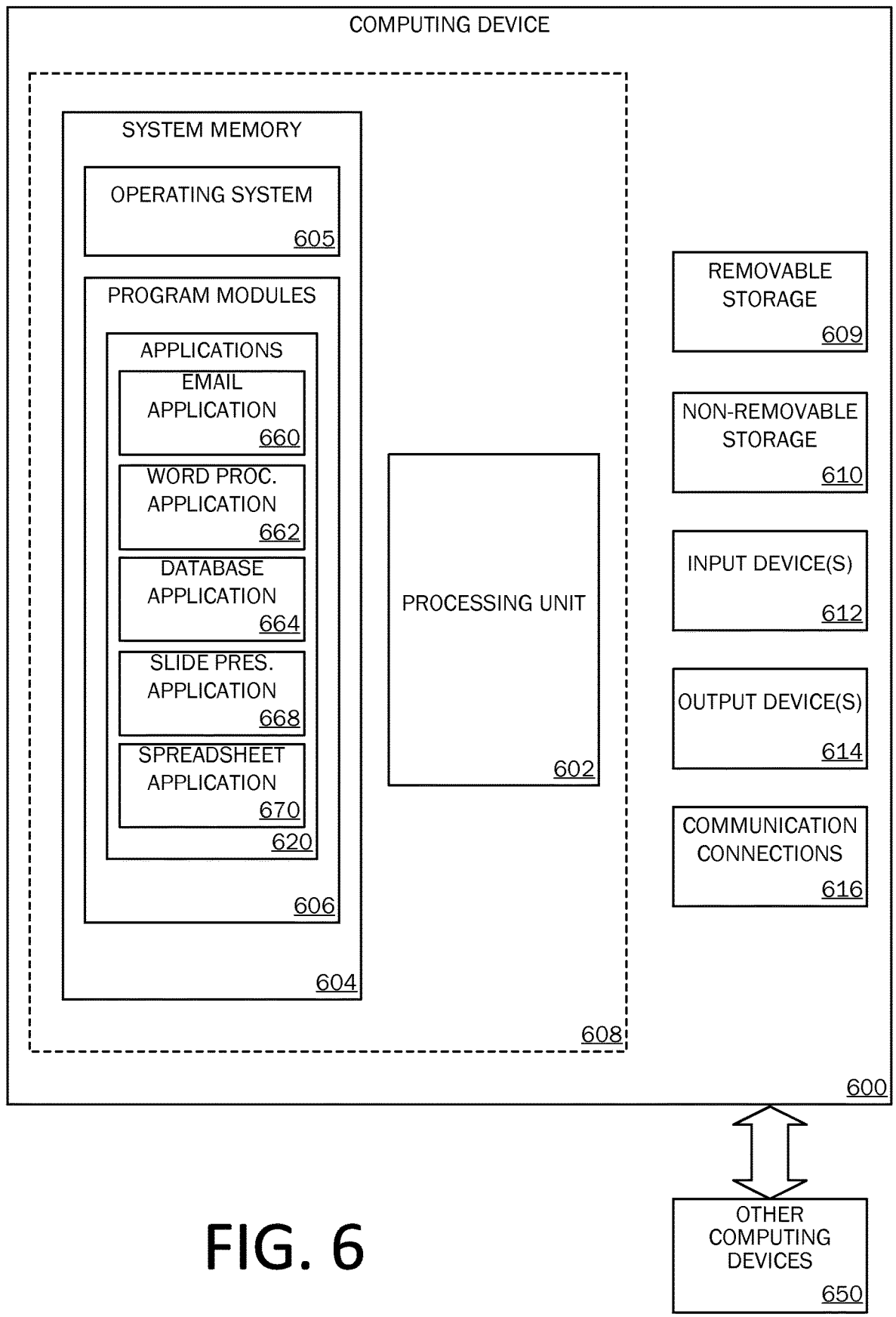
FIG. 6 is a block diagram illustrating example physical components of a computing device with which aspects of the disclosure may be practiced.
Figure 7A:
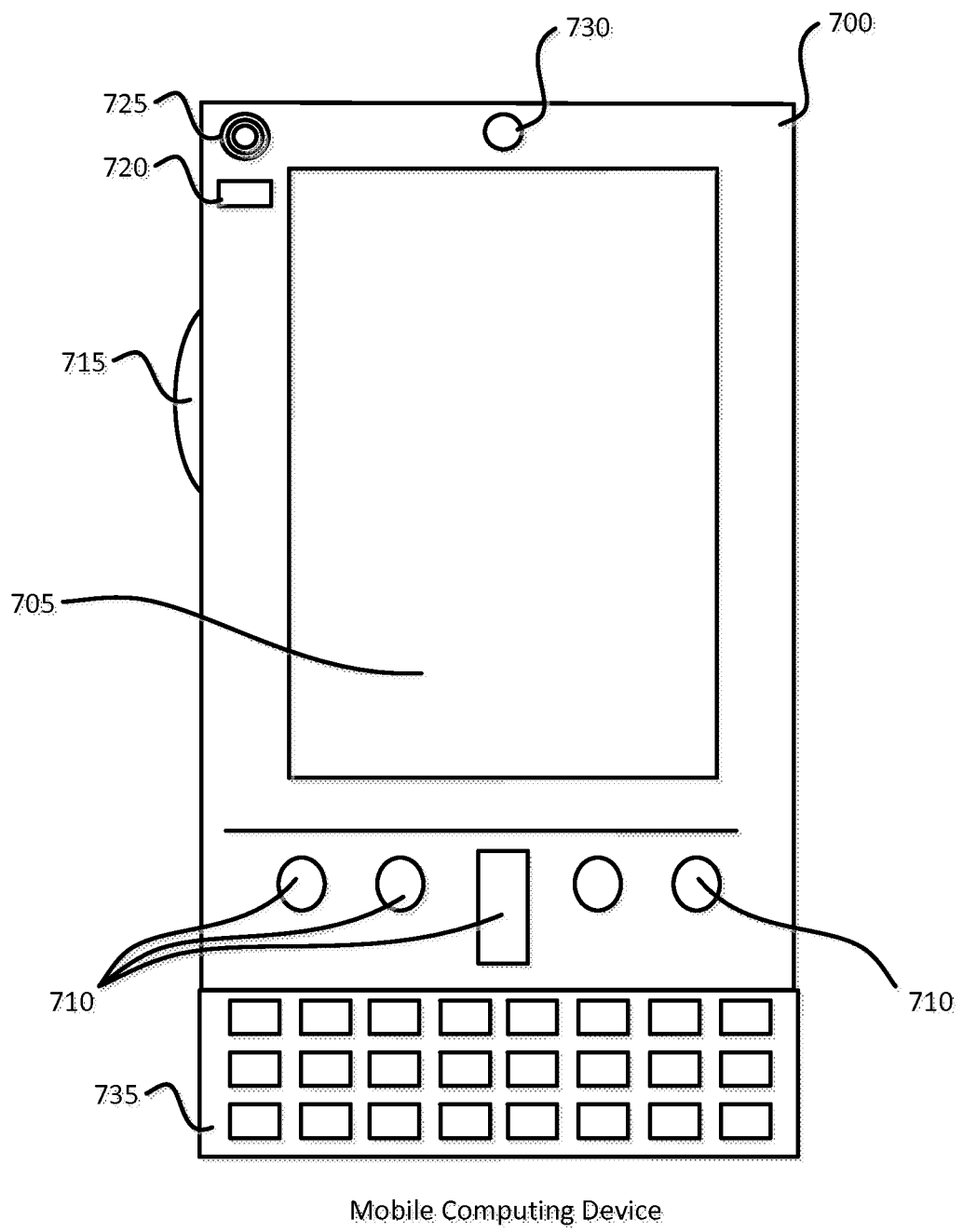
FIGS. 7A and 7B are simplified block diagrams of a mobile computing device with which aspects of the present disclosure may be practiced.
Figure 7B:
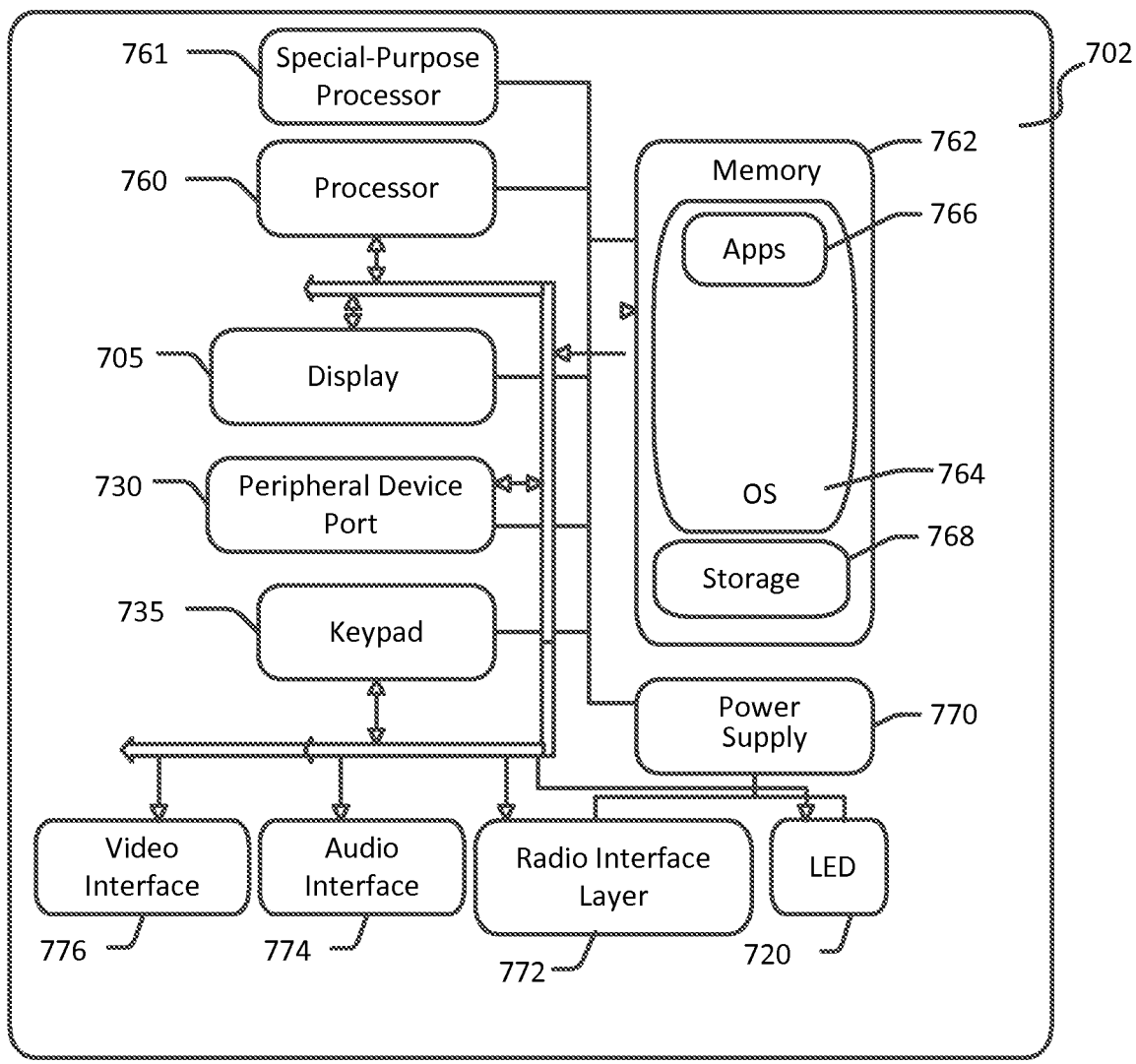
Figure 8:
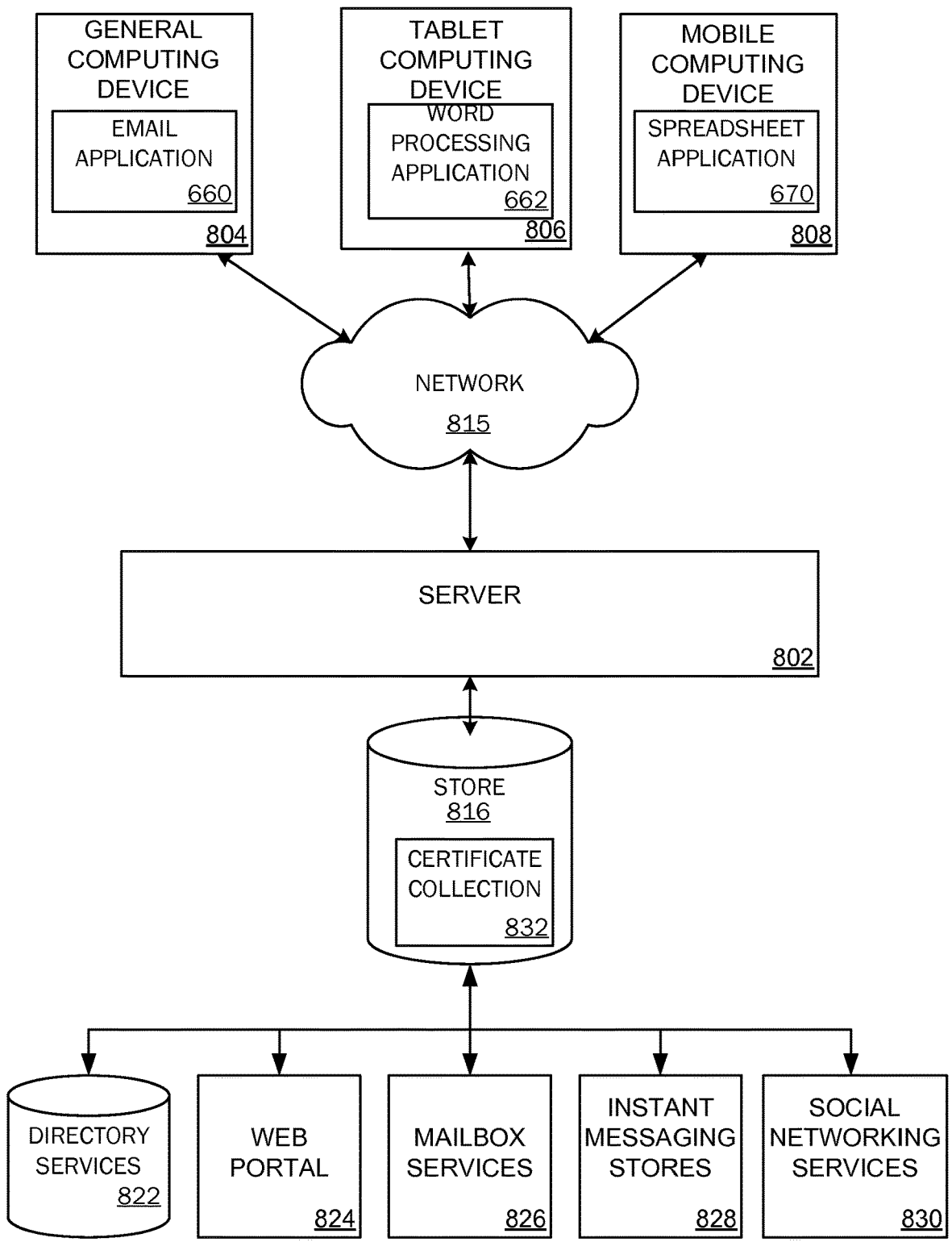
FIG. 8 is a simplified block diagram of a distributed computing system in which aspects of the present disclosure may be practiced.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of computing device configurations that may be utilized for practicing aspects of the disclosure, described herein FIG. 6 is a block diagram illustrating physical components (e.g., hardware) of a computing device 600 with which aspects of the disclosure may be practiced. The computing device components described below may be computer executable instructions for an email application 660, word processing application 662, database application 664, slide presentation application 668, spreadsheet application 670, and any other suitable application that can be executed to employ the methods 400 and 500 disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 utilizing the improved touchable user interface as illustrated in FIGS. 1-3. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including, but not limited to, the aspects, as described herein. Other program modules that may be used in accordance with aspects of the present disclosure, and in particular to generate screen content, may include electronic mail and contacts applications, contact applications, drawing applications, messaging applications, calendaring applications, a social networking application, project management application, a collaboration application, an enterprise management application, and/or etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a wearable computer (such as a smart watch), a tablet personal computer, a laptop computer, a desktop computer, and the like, with which aspects of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touchpad in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one aspect, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions to scale a software application including a touchable user interface as described herein.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated aspect, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates one aspect of the architecture of a system for processing data received at a computing system from a remote source, such as a computing device 804, tablet 806, or mobile device 808, as described above. Content displayed at server device 802 may be stored in different communication channels or other storage types. In this aspect, the general computing device 804 is executing an email application 660 that utilizes the improved touchable user interface for a software application. Further, in this aspect, the tablet 806 is executing a word processing application 662 utilizing the improved touchable user interface for a software application. Additionally, in this aspect, the mobile computing device 808 is executing a spreadsheet application utilizing the improved touchable user interface for a software application. The improved touchable user interface for a software application and a method for generating the improved touchable user interface are described in detail above and illustrated in FIGS. 1-3. For example, various documents may be stored using a directory service 822, a web portal 824, a mailbox service 826, an instant messaging store 828, or a social networking site 830.

Figure 9:
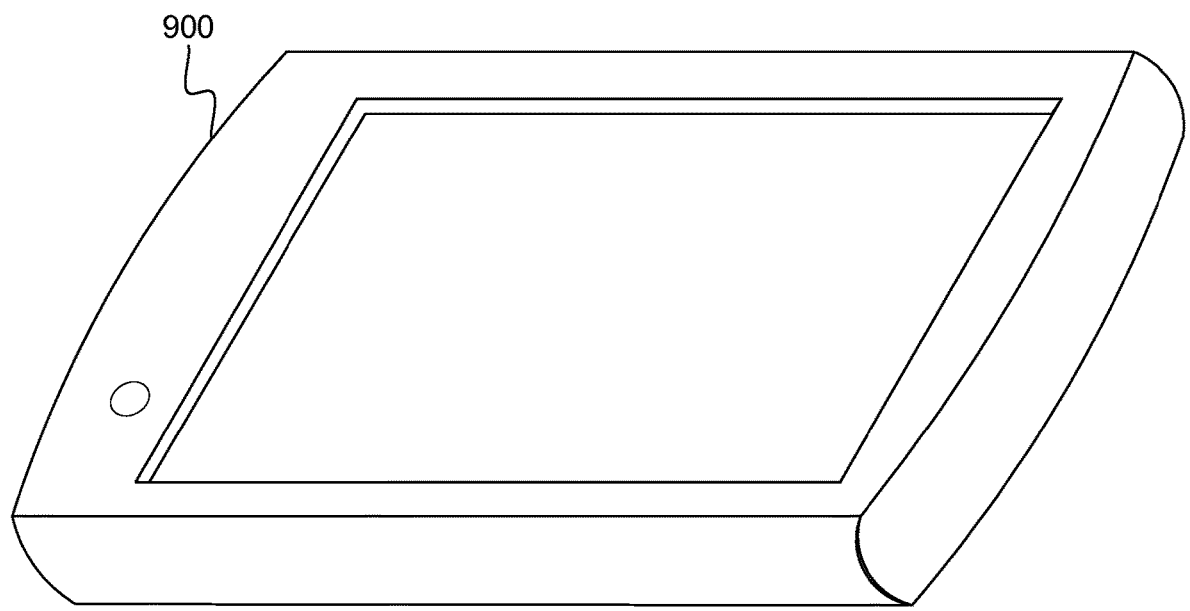
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Among other examples, the present disclosure presents systems for displaying a touchable user interface at a display device, comprising: identifying available application space on the display device; comparing an amount of available application space with an amount of space required for displaying one or more user interface elements; determining whether sufficient space is available for the amount of space required for displaying the one or more user interface elements; and when it is determined that sufficient space is not available, adjusting visible display of the one or more user interface elements such that at least one of the one or more user interface elements is scaled, re-positioned or removed. In further examples, the visible display of the one or more user interface elements is displayed as a grid layout with one or more rows and one or more columns. In further examples, the one or more rows and the one or more columns are scaled based on at least a screen size of the display device. In further examples, the one or more rows and the one or more columns are scaled based on at least how many of the one or more user interface elements can be displayed on the display device. In further examples, a display size of the one or more user interface elements does not change when a screen size of the display device changes such that a number of the one or more user interface elements displayed changes (e.g., a number of the one or more user interface elements is/are re-positioned). In further examples, a display size of the one or more user interface elements changes when a screen size of the display device changes such that a number of the one or more user interface elements displayed does not change (e.g., a number of the one or more user interface elements is/are scaled). In further examples, a screen size of the display device changes based on at least one of a user selection of a desired screen size, a change in a display screen of the display device, and a change in the display device orientation. In further examples, identifying available application space on the display device comprises identifying a change in an amount of available application space. In further examples, comparing an amount of available application space with an amount of space required for one or more user interface elements comprises calculating a layout for the touchable user interface. In further examples, calculating a layout for the touchable user interface comprises determining a size of the one or more user interface elements. In further examples, the adjusted visible display includes at least the one or more user interface elements and a contextual panel having selectable controls.

Further aspects disclosed herein provides exemplary systems and methods for displaying a user interface progress experience on a touchable user interface of a display device, comprising: displaying, on a canvas of the display device, one or more user interface elements; displaying, on a contextual panel of the display device, a plurality of selectable controls; receiving, at the touchable user interface, a selection of at least one action command, wherein the at least one action command is associated with the one or more user interface elements; performing the selected at least one action command; determining whether the selected at least one action command has been completed while performing the selected at least one action command; when it is determined that the selected at least one action command has not been completed, determining whether a threshold value has been met; and when it is determined that the threshold value has been met, displaying the user interface progress experience on the touchable user interface of the display device. In further examples, receiving the selection of at least one action command comprises detecting at least one of a single touch and hand gesture of the one or more user interface elements or one of the plurality of selectable controls on the touchable user interface. In further examples, the selectable controls include functionality for executing the at least one action command. In further examples, the at least one action command includes at least one of opening, saving, creating, printing, closing, and sharing. In further examples, the threshold value is based on avoiding flickering of the user interface progress experience when the at least one action command is performed and completed in less than two seconds. In further examples, the user interface progress experience indicates a status of the selected at least one action command as the at least one action command is performed. In further examples, the status of the selected at least one action command includes text displayed on the touchable user interface of the display device. In further examples, when it is determined that the selected at least one action command has been completed, hiding the user interface progress experience from the touchable user interface of the display device.

Additional aspects disclosed herein provide exemplary methods for displaying a touchable user interface at a display device, comprising: identifying available application space on the display device; comparing an amount of available application space with an amount of space required for displaying one or more user interface elements; determining whether sufficient space is available for the amount of space required for displaying the one or more user interface elements; and when it is determined that sufficient space is not available, adjusting visible display of the one or more user interface elements such that at least one of the one or more user interface elements is scaled, re-positioned, or removed, and wherein the visible display of the one or more user interface elements is displayed as a grid layout with one or more rows and one or more columns.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of improved touchable user interfaces that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   at least one processor; and
   memory encoding computer executable instructions that, when executed by the at least one processor, perform a method for displaying a touchable user interface at a display device, the method comprising:
   identifying, on the display device, available application space for an application, wherein the available application space corresponds to a first window size for the application, and the available application space corresponds to a first arrangement of one or more rows and columns;
   using a priority list to determine one or more document thumbnails and one or more selectable controls to be displayed in the first arrangement, wherein the priority list automatically identifies a first set of document thumbnails and selectable controls based on the first window size, the priority list automatically identifies a second set of document thumbnails and selectable controls to be displayed based on a second window size, and the priority list calculates scaling up to a predetermined maximum window size and/or down to a predetermined minimum window size;
   determining whether an amount of the available application space is sufficient for displaying the one or more document thumbnails by comparing the amount of the available application space with an amount of space required for displaying the one or more document thumbnails; and
   when it is determined that sufficient space is not available, adjusting the first arrangement into a different second arrangement of the one or more rows and columns based on the first window size, wherein at least one of the one or more document thumbnails is re-positioned or removed.

2. The system of claim 1, wherein the visible display of the one or more thumbnails is displayed as a grid layout with one or more rows and one or more columns.

3. The system of claim 2, wherein the one or more rows and the one or more columns are scaled based on at least a screen size of the display device.

4. The system of claim 2, wherein the one or more rows and the one or more columns are scaled based on at least how many of the one or more thumbnails can be displayed on the display device.

5. The system of claim 1, wherein a display size of the one or more thumbnails does not change when a screen size of the display device changes such that a number of the one or more thumbnails displayed changes.

6. The system of claim 1, wherein a display size of the one or more thumbnails changes when a screen size of the display device changes such that a number of the one or more thumbnails displayed does not change.

7. The system of claim 1, wherein a screen size of the display device changes based on at least one of a user selection of a desired screen size, a change in a display screen of the display device, and a change in the display device orientation.

8. The system of claim 1, wherein identifying available application space on the display device comprises identifying a change in an amount of available application space.

9. The system of claim 1, wherein comparing an amount of available application space with an amount of space required for one or more thumbnails comprises calculating a layout for the touchable user interface.

10. The system of claim 9, wherein calculating a layout for the touchable user interface comprises determining a size of the one or more thumbnails.

11. The system of claim 1, wherein the adjusted visible display includes at least the one or more thumbnails and a contextual panel having selectable controls.

12. A computer storage device having computer-executable instructions that, when executed by a processor, perform a method for displaying a user interface progress experience on a touchable user interface of a display device, the method comprising:
  displaying, on a canvas of the display device, one or more document thumbnails, wherein the one or more document thumbnails correspond to one or more applications provided by the display device, and wherein an arrangement of the one or more document thumbnails is based on a priority list that calculates scaling up to a predetermined maximum window size and/or down to a predetermined minimum window size;
  displaying, on a contextual panel of the display device, a plurality of selectable controls;
  receiving, at the touchable user interface, a selection of at least one action command associated with the one or more document thumbnails;
  initiating the selected at least one action command;
  determining whether the selected at least one action command has been completed;
  when it is determined that the selected at least one action command has not been completed, determining a current amount of execution time for the at least one action and comparing the current amount of execution time to a threshold value to determine whether the threshold value has been met; and
  in response to determining that the threshold value has been met, automatically displaying a user interface progress experience on the touchable user interface of the display device, wherein the user interface progress experience indicates a status of the selected at least one action as the selected at least one action is performed.

13. The computer storage device of claim 12, wherein receiving the selection of at least one action command comprises detecting at least one of a single touch and hand gesture of the one or more thumbnails or one of the plurality of selectable controls on the touchable user interface.

14. The computer storage device of claim 12, wherein the selectable controls include functionality for executing the at least one action command.

15. The computer storage device of claim 12, wherein the at least one action command includes at least one of opening, saving, creating, printing, closing, and sharing.

16. The computer storage device of claim 12, wherein the threshold value is based on avoiding flickering of the user interface progress experience when the at least one action command is performed and completed in less than two seconds.

17. The computer storage device of claim 12, wherein the user interface progress experience indicates a status of the selected at least one action command as the at least one action command is performed.

18. The computer storage device of claim 17, wherein the status of the selected at least one action command includes text displayed on the touchable user interface of the display device.

19. The computer storage device of claim 12, further comprising, when it is determined that the selected at least one action command has been completed, hiding the user interface progress experience from the touchable user interface of the display device.

20. A method for displaying a touchable user interface at a display device, the method comprising:
  identifying available application space on the display device, wherein the available application space corresponds to a first window size for an application wherein the identification includes
  using a priority list to determine one or more document thumbnails and one or more selectable controls to be displayed by the display device, wherein the priority list identifies a first set of document thumbnails and selectable controls based on the first window size, the priority list identifies a second set of document thumbnails and selectable controls to be displayed based on a second window size, and the priority list calculates scaling up to a predetermined maximum window size and/or down to a predetermined minimum window size;
  comparing an amount of available application space with an amount of space required for displaying one or more document thumbnails;
  based on the comparison, determining whether the amount of the available application space is sufficient for displaying the one or more document thumbnails; and
  when it is determined that sufficient space is not available, adjusting the first arrangement into a different second arrangement of the one or more rows and columns based on the first window size, wherein at least one of the one or more document thumbnails is re-positioned or removed.

* * * * *